Inventor
Karl Flury
By
Watson, Cole, Grindle + Watson
Attys.

United States Patent Office 3,148,964
Patented Sept. 15, 1964

3,148,964
ARRANGEMENT FOR HUMIDIFYING AIR FLOWING THROUGH AN AIR DUCT
Karl Flury, Austrasse 1, Adliswil, Zurich, Switzerland
Filed July 19, 1961, Ser. No. 126,855
Claims priority, application Switzerland, July 20, 1960, 8,375/60
1 Claim. (Cl. 55—230)

This invention relates to an arrangement for use in humidifying the air flowing through an air duct, by means of a liquid atomizer which is attached to a boundary wall of the air duct and possesses a casing comprising a middle part, a bottom part serving as a liquid storage container and a top part, and having an air inlet and an outlet for the spray produced therein, and accommodating a motor-driven fan for producing a flow from the inlet to the outlet, and a likewise motor-driven unit for mechanically atomizing the liquid and for mixing the atomized liquid with the air flow to form the atomized spray.

In such an arrangement it has already been suggested to fix only the middle part of the casing, which is open at top and bottom, to the boundary wall of the air duct by means of a flange which covers an opening in the boundary wall and contains the outlet, whereby the bottom part of the casing is detachably suspended on the underside of the middle part, and the upper part of the casing is removably placed on top of the upper side of the middle part and carries the atomizing unit, the fan and the motor.

Now the present invention aims at a further development of an arrangement of the last-described type.

The novelty principally consists in that an insert ring, arranged within the carrying middle part of the casing, is removably suspended with its outer peripheral rim on the upper edge of the middle part, encloses the atomizer unit at a distance with a substantially vertical peripheral wall having provided thereon an outlet connector for the atomized spray, and an inwardly projecting conical air supply funnel engaging below the atomizer unit, and that the top part of the casing which carries the fan, atomizer unit and motor is removably placed on the outer peripheral rim of the insert ring.

Further features of the invention will appear from the following description and claim, taken in conjunction with the accompanying drawing wherein there is shown, purely by way of example, one form of embodiment incorporating the invention.

Figure 1:
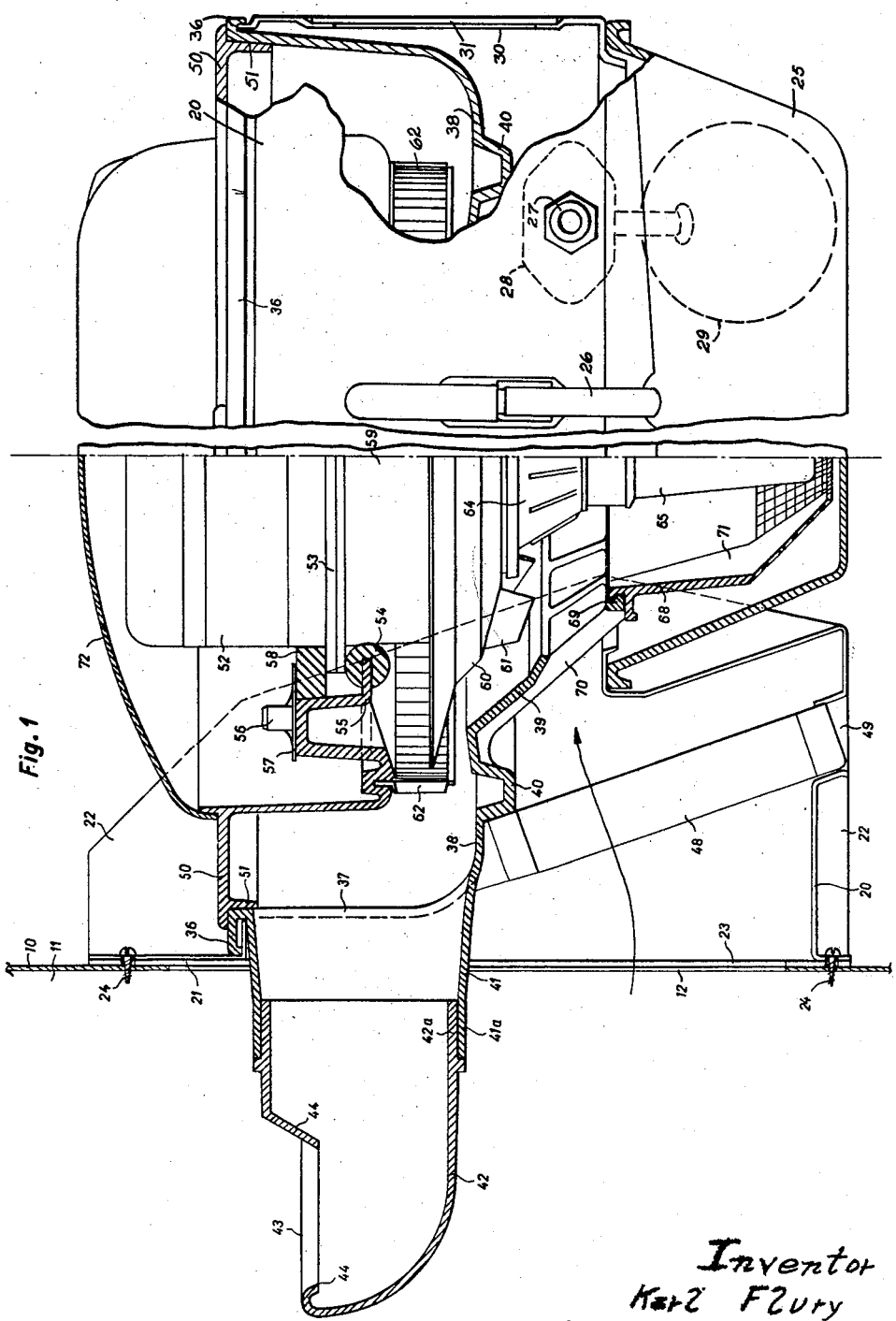
FIG. 1 shows partly in vertical section and partly in side view a liquid atomizer as attached to a wall of an air duct.
Figure 2:
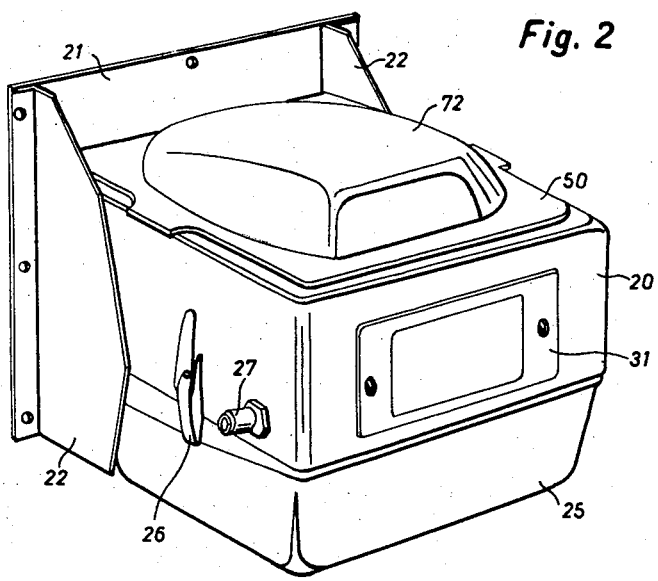
FIG. 2 shows a diagrammatic view of the liquid atomizer alone, seen partly from the right and top in FIG. 1.

Referring to FIG. 1, numeral 10 designates a boundary wall of an air duct which is not further shown. The air duct 11 leads, for instance, from a hot-air stove at first vertically upwards, to then reach several rooms of a building which are to be heated by means of warm air. A rectangular opening 12 is cut in the wall 10 and has attached thereto a liquid atomizer which is described hereafter.

The casing of the liquid atomizer includes a substantially ring-shaped middle part 20 which is open at top and bottom and forms a component part of a carrying structure which otherwise embodies a rectangular flange 21 with brackets 22 attached thereto. Said middle part 20, flange 21 and brackets 22 consist of sheet metal plates that are joined together by spot welding. The flange 21 has a rectangular opening 23 which substantially corresponds to the opening 12 in the air duct wall 10. By means of screws 24, the flange 21 and therewith the entire carrying structure 20–22 of the liquid atomizer is attached to the wall 10 which consequently serves as a support therefor.

The bottom part 25 is designed as a liquid storage container and is removably secured to the lower edge of the middle part 20 by means of two toggle clamps 26. The middle part 20 has further arranged thereon a screw-threaded nipple 27 for connection to a pressure-water pipe. The casing part 20 houses a valve 28 which is operable by a float 29 dipping into the container 25 so that the liquid level therein always remains practically unchanged. Arranged at the front of the middle part 20 is a window 30 which is closed by a removable cover 31. Upon removal of cover 31, the valve 28 is readily accessible and adjustable through the window 30.

The middle part 20 has located therewithin an insert ring 36–40 whose outer peripheral rim 36 is loosely suspended on the upper edge of said part 20. From the rim 36 a peripheral wall 37 of said ring extends substantially vertically downwards to a rounded portion whence inwardly to form a substantially horizontal section 38 which joins on to a conical air supply funnel 39. In the horizontal section 38, i.e. between the substantially vertical peripheral wall 37 and funnel 39 there is provided a collecting trough 40 which extends circumferentially and is of comparatively small width to allow the air to pass radially thereover without notable eddying. From the collecting trough 40 at least one discharge pipe (not visible in the drawing) extends to the floor of the container 25, the pipe being suspended on the ring 36–40.

Figure 3:
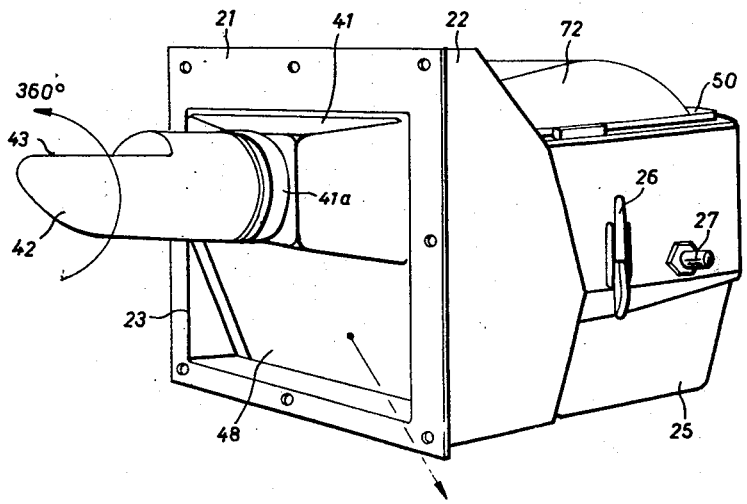
FIG. 3 is another diagrammatic representation of the liquid atomizer, seen partly from the left in FIG. 1.

At a point in the substantially vertical peripheral wall of the insert ring 36–40 there is formed an outlet connector 41 for the atomized spray being produced. The outlet connector projects through the upper portion of the openings 23 and 12 in flange 21 and wall 10 into the air duct 11, and carries a blow-out nozzle 42. The latter is designed so as to deflect the spray. For this purpose, the blow-out nozzle 42 possesses a laterally disposed outlet 43, whose direction includes approximately a right angle with the longitudinal axis of the outlet connector 41. The connector 41 and the blow-out nozzle 42 are loosely joined to each other by interengaging cylindrical parts 41a and 42a, so as to make it possible to turn the nozzle 42 about the longitudinal axis of the connector 41 into any desired direction. The outlet 43 may thus be directed not only upwards (as in FIGS. 1 and 3) but, if necessary, also downwards or to the left or right side, always in such a way that the outlet 43 is turned away from the air flow through the duct 11. Around the outlet 43 there extends a rim 44 which is curled inwards against the blow-out direction so as to retain larger spray droplets that cannot follow the deflection by the nozzle, and is adapted to collect any condensate in the case of the opening 43 being directed downwards.

The outlet connector 41 and the lower rim of the opening 23 have arranged therebetween the air inlet of the atomizer and an associated filter 48. The latter is removably inserted in drawer-fashion into a corresponding slot 49 in the middle casing part 20 in a direction at right angles to the flow. If the filter 48 is clogged, it may be withdrawn and replaced by a new similar one that is simply inserted into the slot 49 from below. By a slight frictional action of the walls of slot 49 on the filter it is retained in its position.

An upper casing part 50 is loosely placed on the rim 36 of the insert ring 36–40 and secured by a rim 51 against displacement in the horizontal direction. Located in the center of the ring-shaped casing part 50 is an electric motor 52 with vertical shaft. An outer flange 53 of motor 52 rests on a rubber-elastic ring 54 which is fixed to an inner flange 55 of the casing part 50. At the top side of flange 55 some pegs 56 project upwards, each having a clamping disk 57 pushed thereon. Said disks 57 press a rubber-elastic ring 58 from above onto the outer flange 53 of motor 52 so that this is flexibly retained between the two rings 54 and 58. Under the motor 52 is a casing part 59 that is likewise held by an outer flanged clamped between said two rings. The casing part 59 closes the central opening of the upper part 50.

The shaft (not shown) of the motor 52 protrudes through the casing part 59 and carries a conical centrifugal disk 60 having arranged on its underside fan vanes 61 to produce an air flow from the filter 48 to the blow-out nozzle 42. The aforementioned air supply funnel 39 of the insert ring 36-40 engages under the centrifugal disk 60. The upper casing part 50 has further affixed thereto a stationary baffle ring 62 which surrounds the centrifugal disk 60 with clearance. The disk 60 is detachably mounted on the shaft of motor 52 by means of a nut piece 64 having arranged thereon a suction tube 65 extending downwards almost to the floor of the liquid storage container. The suction tube communicates with the top side of the disk 60 through elongated ports in the nut piece 64. Centrifugal disk, suction tube 65 and baffle ring 62 together constitute a mechanical atomizer unit. For further particulars reference is made, for instance, to the specification of the U.S. Patent No. 2,874,797, issued February 24, 1955, or U.S. patent application Serial No. 809,756, filed April 29, 1959.

The suction tube 65 is surrounded with clearance by a perforated sludge separator 68 which is located in the center of the air supply funnel 39. Through a plug-and-socket connection the sludge separator 68 is detachably secured to a ring 69 which is joined to said funnel 39 by means of webs 70. Provided within the separator 68 are some stationary vanes 71 adapted to counteract rotation of the liquid.

The casing part 50 has removably placed thereon a hood 72 covering the motor 52.

The action of the aforedescribed humidification arrangement is as follows: Centrifugal disk 60 and suction tube 65 are rotated by the motor 52. The fan vanes 61 cause a powerful air flow from the filter 48 to the outlet connector 41, whereby part of the air flowing through the duct 11 will be branched off, directed through the atomizer and then again returned to the duct 11. Within the suction tube 65 the liquid rises due to the centrifugal action. The liquid then passes through said ports in the nut piece 64 to the top side of the centrifugal disk 60, where it is spread out to a thin film and thrown out from the peripheral edge of the disk 60. Through the stationary baffle ring 62 the liquid film is broken up into tiny droplets, which are seized by the air flow and mixed with the air to form an atomized spray. The spray thus produced is ejected through the outlet connector 41 and blow-out nozzle 41 into the air duct 11, where it mixes with and humidifies the air therein.

A decided advantage of the described arrangement over similar arrangements known heretofore consists in the simpler structural design and the lower manufacturing cost. Since the insert ring 36-40 with its substantially vertical wall 37 extends beyond the upper edge of the middle casing part 20, and the outlet connector 41 leads direct into the air duct 11, the atomized spray cannot enter the part 20 so that the latter need not be tight and may consequenly be formed by a comparatively cheap sheet-metal construction. This also makes it possible to provide the window 30 which renders the valve 28 readily accessible and adjustable. The atomized spray within the atomizer is only between the insert ring 36-40 and the upper casing part 50 whose central opening is sealed off by means of the casing part 59. Hence only two points are required to be sealed. The adjustable blow-out nozzle 42 permits of using the same atomizer on a vertical, horizontal or even inclined air duct with any direction of flow.

Advantageously, the described liquid atomizer may be readily disassembled in its most part parts without the help of tools, in order to be cleaned conveniently. Maintenance is thus very simple and may be easily carried out by technically unskilled personnel. The easy exchange-ability of the filter 48 likewise facilitates maintenance.

Outlet connector 41 and blow-out nozzle 42 need not necessarily be joined to each other by cylindrical portions 41a and 42a, as it is also possible to give the interengaging portions a square section so that the nozzle can be attached to the outlet connector in four different positions.

What I claim is:

Apparatus for humidifying air with a liquid atomizer comprising an air duct, a casing having a main middle part fixed to said air duct, an insert ring mounted in said middle part with its outer peripheral rim on an upper edge of said middle part, a lower casing part containing a liquid reservoir and secured to the middle part, an upper casing part arranged on said insert ring, a mechanically operating atomizer and fan supported by said upper casing part, said insert ring having a vertical peripheral wall with an outlet connector having a longitudinal axis and projecting into the air duct, said middle casing part having an air inlet opening therein communicated with said air duct, an outlet nozzle connected to the outlet connector and protruding into said air duct and having an outlet opening therein, the outlet opening of the nozzle being disposed at approximately a right angle with the axis of the outlet connector, an inwardly turned rim provided around said outlet opening of the nozzle, and means for rotatably supporting said outlet nozzle in the outlet connector so that when the outlet nozzle is rotated with the outlet opening facing downwardly the rim will collect any condensate and prevent the same from dropping out of the outlet opening.

References Cited in the file of this patent

UNITED STATES PATENTS

| 1,864,797 | Braemer | June 28, 1932 |
| 2,028,444 | Feldermann | Jan. 21, 1936 |
| 2,125,581 | Pearce | Aug. 2, 1938 |
| 2,189,021 | Schury | Feb. 6, 1940 |
| 2,766,027 | Herr | Oct. 9, 1956 |
| 2,860,228 | Boyle et al. | Nov. 11, 1958 |
| 2,874,797 | Flury | Feb. 24, 1959 |
| 2,984,464 | Herr | May 16, 1961 |

FOREIGN PATENTS

| 207,992 | Austria | Mar. 10, 1960 |
| 351,241 | Switzerland | Feb. 15, 1961 |
| 501,002 | Italy | Nov. 22, 1954 |